United States Patent
Martens et al.

(10) Patent No.: US 11,603,823 B2
(45) Date of Patent: Mar. 14, 2023

(54) METHOD FOR ASCERTAINING A WIND DIRECTION AT A WIND POWER INSTALLATION, SYSTEM FOR ASCERTAINING A WIND DIRECTION, AND A WIND POWER INSTALLATION

(71) Applicant: Wobben Properties GmbH, Aurich (DE)

(72) Inventors: Michael Martens, Wittmund (DE); Gerke Funcke, Oldenburg (DE); Matthias Arnold, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/162,679

(22) Filed: Jan. 29, 2021

(65) Prior Publication Data
US 2021/0254603 A1    Aug. 19, 2021

(30) Foreign Application Priority Data
Jan. 31, 2020 (DE) ..................... 10 2020 102 454.1

(51) Int. Cl.
    *F03D 17/00* (2016.01)
    *F03D 7/02* (2006.01)

(52) U.S. Cl.
    CPC .......... *F03D 17/00* (2016.05); *F03D 7/0204* (2013.01); *F05B 2270/32* (2013.01); *F05B 2270/321* (2013.01)

(58) Field of Classification Search
None
See application file for complete search history.

(56) References Cited

U.S. PATENT DOCUMENTS

| | | | |
|---|---|---|---|
| 4,353,681 A | 10/1982 | Doman | |
| 6,946,751 B2 * | 9/2005 | Yoshida | F03D 7/042 290/43 |
| 10,280,897 B2 * | 5/2019 | Markham | F03D 7/0224 |
| 2004/0183307 A1 * | 9/2004 | Yoshida | F03D 7/042 290/44 |
| 2007/0086893 A1 | 4/2007 | Pedersen | |

(Continued)

FOREIGN PATENT DOCUMENTS

| | | |
|---|---|---|
| DE | 3119736 C2 | 11/1987 |
| DE | 102012019663 A1 | 4/2014 |

(Continued)

*Primary Examiner* — Juan G Flores
(74) *Attorney, Agent, or Firm* — Seed Intellectual Property Law Group LLP

(57) ABSTRACT

A method for ascertaining a wind direction at a wind power installation having a rotor on which at least one rotor blade is arranged. The method includes measuring first wind speeds in a predefined first measuring direction and second wind speeds in a predefined second measuring direction different from the first measuring direction in each case with a measuring frequency at a measuring point for a measuring period, wherein the measuring period is defined by a rotational distance of the rotor or by a prespecified time, wherein the rotor blade or one of the rotor blades passes the measuring point in the measuring period, and determining a wind direction by vectorial evaluation of the first wind speeds and of the second wind speeds.

18 Claims, 7 Drawing Sheets

(56) References Cited

U.S. PATENT DOCUMENTS

2014/0028025 A1* 1/2014 Ibendorf ................. F03D 17/00
                                                           290/44
2014/0140843 A1   5/2014 Spruce et al.
2017/0167470 A1* 6/2017 Markham ............. F03D 7/0204
2018/0355846 A1* 12/2018 Nielsen ................ F03D 7/0224

FOREIGN PATENT DOCUMENTS

| DE | 102014223853 A1 | 5/2016 | | |
|---|---|---|---|---|
| DE | 102018001172 A1 | 8/2019 | | |
| EP | 1460266 A2 | 9/2004 | | |
| WO | 2007/014400 A2 | 2/2007 | | |
| WO | 2013/083135 A1 | 6/2013 | | |
| WO | WO-2017107693 A1 * | 6/2017 | ............... | F03D 7/02 |

* cited by examiner

METHOD FOR ASCERTAINING A WIND DIRECTION AT A WIND POWER INSTALLATION, SYSTEM FOR ASCERTAINING A WIND DIRECTION, AND A WIND POWER INSTALLATION

BACKGROUND

Technical Field

The disclosure relates to a method for ascertaining a wind direction at a wind power installation, to a system for ascertaining a wind direction at a wind power installation, and to a wind power installation.

Description of the Related Art

Wind power installations are basically known; they generate electrical power from wind. Wind power installations generally relate to what are referred to as horizontal-axis wind power installations, in which the rotor axis is arranged substantially horizontally and the rotor blades sweep over a substantially vertical rotor face. In addition to a rotor arranged on a nacelle, wind power installations generally comprise a tower on which the nacelle with the rotor is arranged so as to be rotatable about a substantially vertically oriented axis. The rotor conventionally comprises three rotor blades, with it also being possible for fewer or more rotor blades to be provided.

The rotatable arrangement of the nacelle on the tower enables the rotor which is arranged on the nacelle to be oriented in the wind direction. This means in particular that the rotor axis is oriented substantially parallel to the wind direction. However, the wind direction and the wind speed are not static variables. The wind direction changes continuously over time. The same is true of the wind speed. Since wind power installations have a limited height, they harvest the wind below the free atmosphere. This wind is affected by friction and can be further affected in particular by morphological structures.

In particular from an aerodynamic perspective, wind power installations are constructed in such a manner that the axis of rotation of the rotor is oriented substantially parallel to the wind direction. For this purpose, the nacelle is rotated in a rotatory manner relative to the tower so that the rotor is oriented substantially to the windward side. In the event of deviations from said orientation to the windward side, the efficiency of the wind power installation is reduced. In particular in the partial load range, an imprecise orientation to the windward side results in a lower power of the wind power installation. Furthermore, an imprecise orientation to the windward side results in a shorter service life since the load levels may be increased.

Prior art methods for ascertaining a wind direction at a wind power installation are disclosed in DE 10 2018 001 172 A1, DE 31 19 736 C2, and DE 10 2014 223 853 A1.

BRIEF SUMMARY

Provided is a method for ascertaining a wind direction at a wind power installation, a system for ascertaining a wind direction at a wind power installation, and a wind power installation, which may reduce or eliminate one or more of the disadvantages mentioned. In particular, in at least one embodiment the method permits a better orientation of the rotor of a wind power installation to the windward side.

According to a first aspect, provided is a method for ascertaining a wind direction at a wind power installation having a rotor on which at least one rotor blade is arranged, comprising the steps of: measuring first wind speeds in a predefined first measuring direction and second wind speeds in a predefined second measuring direction different from the first measuring direction in each case with a measuring frequency at a measuring point for a measuring period, wherein the measuring period is defined by a rotational distance of the rotor or by a prespecified time, wherein the rotor blade or one of the rotor blades passes the measuring point in the measuring period, and determining a wind direction by vectorial evaluation of the first wind speeds and of the second wind speeds.

The wind power installation preferably comprises a tower on which the rotor is arranged in a rotatory manner, wherein the rotor can preferably rotate firstly about a substantially horizontal axis and secondly about a vertical axis. The rotor has the at least one rotor blade. The rotor preferably has two, three or more rotor blades.

The first wind speeds are measured in the predefined first measuring direction with a measuring frequency. The first wind speeds are preferably measured at a time interval. For example, they can be measured every 100 milliseconds, with a higher measuring frequency resulting in greater accuracy. A first wind speed is distinguished in particular in that the latter has been measured in the predefined first measuring direction. Analogously, thereto, the second wind speeds are measured in the second measuring direction. Preferably, in each case a first wind speed and a second wind speed are sensed in pairs. This can be undertaken, for example, with a two-dimensional anemometer.

The first wind speeds are measured in the predefined first measuring direction preferably in such a manner that a multiplicity of measurement values that each represent one of the first wind speeds are determined. The second wind speeds are measured in the predefined second measuring direction preferably in such a manner that a multiplicity of measurement values that each represent one of the second wind speeds are determined.

The first and second wind speeds are measured and data are preferably produced that represent the first and second wind speeds and/or the measurement values of the first and second wind speeds. Said data can be further processed.

The vectorial evaluation of the first wind speeds and of the second wind speeds has the effect that the vectors at measuring times that are obtained during the passage of the rotor blade in front of the measuring arrangement, for example an anemometer, have less influence on the result during the evaluation. During the passage of the rotor blade, lower wind speeds are conventionally prevailing, and therefore the latter have little effect on a vectorial evaluation.

The selection of the measuring period has the particular advantage that the measurement contains a reproducible or defined error since precisely one rotor blade passes the measuring point per measuring period. Such a reproducible or defined error is advantageous since it can be corrected.

The predefined first measurement direction and the predefined second measurement direction are different from each other. Preferentially, both the predefined first measurement direction and the predefined second measurement direction span an angle with an axis of the rotor of the wind power installation, wherein the axis of the rotor is generally in the horizontal plane. Expressed differently, neither the first measurement direction nor the predefined second measurement direction is parallel to the axis of the rotor. The predefined first measurement direction and the predefined second measurement direction can be located in the horizontal plane or span an angle with the horizontal plane. Preferentially, the angle between the predefined first or second measurement direction and the axis of the rotor exceeds a predefined minimum angle of 30°.

In one embodiment, both the predefined first measurement direction and the predefined second measurement direction are arranged symmetrically with regard to the axis of the rotor. Further preferentially, the predefined first measurement direction is in this embodiment orthogonal to the predefined second measurement direction.

In one embodiment, the method furthermore comprises determining wind vectors from first wind speeds and second wind speeds for the measuring period, wherein the wind direction is determined by vectorial evaluation of the wind vectors. The wind vectors are preferably formed on the basis of a first wind speed and a second wind speed. The measuring points of the first wind speed and of the second wind speed, which form the wind vector, are preferably identical within the scope of the measurement resolution, i.e., belong together. Accordingly, in the measuring period, a series or list of wind vectors arises, the wind vectors then being able, for example, to be averaged in order to determine the wind direction.

The measuring point is arranged close to the rotor. This means, for example, that the measuring point is arranged on a nacelle of the wind power installation. The measuring point is preferably arranged to the rear of the rotor in the wind direction, i.e., leeward.

Preferably, the vectorial evaluation of the first wind speeds and of the second wind speeds comprises determining a first average wind speed by averaging the first wind speeds, and a second average wind speed by averaging the second wind speeds, wherein the wind direction follows by vectorial evaluation of the first average wind speed and of the second average wind speed.

A first average wind speed is determined by averaging the first wind speeds. The first average wind speed represents a mean value of the first wind speeds in the first measuring direction. The first average wind speed can be, for example, an arithmetic mean value or a harmonic mean value. Furthermore, a second average wind speed is determined by averaging the second wind speeds. The second average wind speed represents a mean value of the second wind speeds in the second measuring direction. The second average wind speed can be, for example, an arithmetic mean value or a harmonic mean value. The first average wind speed applies to the first measuring direction. The second average wind speed applies to the second measuring direction. Data representing the first and the second average wind speed are preferably produced.

For the determination of the first and second average wind speeds, use is made of the first and second wind speeds which have been measured within the measuring period. If the measuring period is for example 6 seconds, and the measuring frequency is 10 Hz (hertz), or a wind speed is measured every 100 milliseconds, in each case sixty values of first and second wind speeds are used for determining the first and second average wind speed.

The measuring period is defined, for example, by a rotational distance of the rotor. This can be, for example, 120°. Furthermore, the measuring period can be defined by a prespecified time, for example, 6 seconds. For the selection of the measuring period, it is crucial that, during this time, the rotor blade or one of the rotor blades passes the measuring point in the measuring period. This means in particular that at least one blade passage takes place at the measuring point in the measuring period. Only by also taking into consideration a blade passage can a complete picture of the wind conditions at the measuring point be determined. Leaving out a blade passage may falsify this picture and result in inadequate operational management.

A wind direction is determined preferably by vectorial evaluation of the first average wind speed and of the second average wind speed. The direction of the first average wind speed and of the second average wind speed is predefined by the first measuring direction and the second measuring direction. Owing thereto and by taking the average wind speeds into consideration, the wind direction can be determined, for example, by Pythagoras's theorem.

The disclosure is based on the finding that the scalar determination of the wind direction that is known in the prior art is inadequate, in particular is error prone. Furthermore, the known scalar determination of the wind direction is not sufficiently precise. By ascertaining wind speeds in two predefined measuring directions and the resulting determination of average wind speeds, from which the wind direction is determined, a robust and precise method for ascertaining the wind direction at a wind power installation arises. This becomes clear in particular taking into consideration the fact that the wind speed at a measuring point of a wind power installation conventionally fluctuates by 10% to 40%.

Furthermore, the prevailing wind direction also always fluctuates. As a result, a wind power installation having the method for ascertaining a wind direction can be operated with greater efficiency and therefore with a greater power, in particular in the partial load range. Furthermore, the service life of the wind power installation is improved since the load levels deviate less from the design loads.

In a preferred variant embodiment of the method, it is provided that the measuring point is arranged on a nacelle of the wind power installation, wherein the measuring point is preferably situated on an upper portion of the nacelle in the vertical direction, and, furthermore preferably, the measuring point is arranged substantially immovably on the nacelle.

The measuring point is preferably located leeward from the rotor during the operation of the wind power installation. The measuring point is preferably arranged at a highest point of the nacelle.

A further preferred variant embodiment of the method is distinguished in that the first wind speeds and the second wind speeds are measured with a two-dimensional anemometer, in particular with a digital ultrasonic anemometer.

The two-dimensional anemometer is configured in particular to measure the first wind speeds in the first measuring direction and to measure the second wind speeds in the second measuring direction. This measurement in the first measuring direction and in the second measuring direction is made possible by measuring the first wind speeds and the second wind speeds with the two-dimensional anemometer.

In a further preferred variant embodiment of the method, it is provided that the first measuring direction and the second measuring direction are oriented orthogonally with respect to each other, wherein preferably the first measuring direction and the second measuring direction are oriented substantially horizontally.

By means of an orthogonal orientation of the first measuring direction and of the second measuring direction, the determination of the wind direction by vectorial evaluation is simplified. As a result, for example, a required computing power for carrying out the determination of the wind direction becomes lower. Furthermore, the wind direction can be determined more rapidly.

Substantially horizontal means in particular that the first measuring direction and/or the second measuring direction deviates less than 30°, less than 20°, less than 10° or less than 5° from a horizontal.

Furthermore, it is preferred that the measuring frequency for the first measuring direction and for the second measuring direction is substantially identical.

The measuring frequency for the first measuring direction and for the second measuring direction can be, for example, between 0.1 Hz and 100 Hz. In particular, it is preferred that the measuring frequency is at least 5 Hz, preferably at least 10 Hz or particularly preferably at least 20 Hz.

In a further preferred development of the method, it is provided that one of the first wind speeds and one of the second wind speeds are in each case measured in pairs and/or are measured substantially isochronously. Furthermore, it may be preferred that there are at most 100 ms (milliseconds), preferably at most 50 ms, between two measurements of the first wind speeds, and/or at most 100 ms, preferably at most 50 ms, between two measurements of the second wind speeds. A further development makes provision for the prespecified time of the measuring period to be less than 10 seconds, in particular less than 8 seconds, preferably less than or equal to 6 seconds. The maximum measuring period is thus of a sufficient length in order to include at least one passage of a rotor blade during typical rotational speeds of wind power installations.

Sensing of the first and second wind speeds in pairs can be undertaken, for example, with a two-dimensional anemometer. The wind acts continuously on the anemometer. By definition of a measuring frequency, the first wind speed and the second wind speed can be sensed in pairs. For example, this can also be undertaken by the first wind speed and the second wind speed being measured isochronously. As a result, for example, it is also possible to determine a wind speed vector which is defined by the first wind speed and the second wind speed.

The rotational distance is preferably ascertained here via a rotor position that is provided, in particular permanently, by a sensor, for example a rotational speed sensor for ascertaining the rotational speed of the rotor. It is known in this connection that sensors of this type ascertain the rotor position, for example, relative to one complete revolution, for example by counting lines or the like. For example, depending on the number of lines provided, a resolution of 500 or more positions can thus be achieved per revolution of the rotor. Alternatively or additionally, ascertaining is advantageously also possible by means of inertial sensors, for example gyroscope and acceleration sensors, or other sensors, including tension bands, magnetic strips or pulsors.

In a further preferred development of the method, it is provided that the rotation distance of the rotor is between 115° and 125°.

The range of the rotational distance is selected in such a manner that a blade passage is at any rate sensed without adjustments having to be undertaken for this purpose. Accordingly, greater accuracy is not required, and therefore the requirements imposed on sensors used for ascertaining a rotational distance of the rotor remain low; in particular, a low resolution of the ascertained or measured rotor position or of the rotational distance suffices.

Similarly, the accuracy of the rotational distance under consideration is restricted by the temporal resolution of the measurement of the wind speed. For example, the resolution of the anemometer can be 10 Hz, and therefore 10 measurements of the wind speed are carried out per second.

In this case, use is made of all of the measurements of the anemometer that are recorded during passage through the rotational distance. To simplify the calculation, for example, it is possible to use only measuring intervals lying completely in the final measuring period, i.e., the passage through the rotational distance. If, for example, 7.6 measurements fall in the measuring period, then only the final 7 measurements can be used. Alternatively, it is also possible to round up to the next whole number, which, in the example, means using 8 measurements, or the values partially falling into the measuring period can be proportionately used, for example the eighth oldest measurement value with a weighting of 0.6 could be used.

In a particularly preferred development of the method, it is provided that the latter comprises the step of: adjusting the wind direction depending on a set pitch angle and/or an arising tip speed ratio.

The pitch angle describes in particular an angle between a chord of the rotor blade and the wind incidence direction. The pitch angle is conventionally adjustable by means of a pitch drive. The rotor blade can be moved in a rotatory manner about the rotor blade longitudinal axis by means of the pitch drive. The pitch angle is adjusted by the rotatory movement of the rotor about its rotor blade longitudinal axis.

The tip speed ratio is defined as the ratio of a peripheral speed of the blade tip to the wind speed a good distance in front of the rotor plane. In the case of wind power installations having three rotor blades of the megawatt and multi-megawatt class, the tip speed ratio can be, for example, 6 to 9 in the design operating point.

The aim of the disclosure for ascertaining the wind direction is to obtain a smooth result, i.e., a wind direction with reproducible results. Since the method according to the disclosure contains one blade passage per measuring interval, an error caused by the blade passage is present. In contrast to alternative methods which, for example, dismiss the measurement values of the blade passage, the error present according to the disclosure is, however, reproducible and thus correctable.

A wind direction adjustment which is dependent on a tip speed ratio and/or a pitch angle is preferably undertaken. For this purpose, an adjustment which depends on the tip speed ratio and/or the pitch angle is particularly preferably stored in the form of a function or table in the wind power installation.

While the pitch angle can be measured directly, the tip speed ratio can be ascertained, for example, depending on air density, wind speed and rotational speed. For this purpose, it is possible and advantageous, as an alternative to a measured wind speed, to calculate the wind speed in a known manner from an operating point of the wind power installation by means of a wind estimator.

In a further preferred variant embodiment of the method, it is provided that a wind direction signal characterizing the wind direction is produced, and the method comprising the step of: weighting the wind direction signal with a weighting factor.

The anemometer, preferably two-dimension anemometer, preferably produces the wind direction signal characterizing the wind direction. The wind direction signal can be weighted with a weighting factor, for example, depending on the rotor position. For example, during a blade passage at the measuring point, a specific weighting factor for the first and second wind speeds measured at this time can be used. A particular advantage of the vectorial evaluation is that the induced error does not have such a great influence at the low speeds that prevail during the blade passage as is the case for scalar evaluations. There is thus a tendency to encounter significantly lower wind speeds and therefore shorter vectors during the blade passage, which have correspondingly little influence on a vector addition. This behaviour can be reinforced further if the wind direction signal is charged with a weighting factor.

In a further preferred development of the method, it is provided that the latter comprises the step of: determining an averaged average wind speed by scalar evaluation of the first wind speeds and of the second wind speeds. Accordingly, it is particularly advantageous to determine the average wind speed with a scalar method, in particular in contrast to the wind direction. Account is thus taken of the fact that a vectorial averaging of the wind speed otherwise in different wind directions results in too low a value of the average wind speed although in actual fact there is a large amount of wind.

A further preferred variant embodiment of the method provides that the wind power installation has an incremental sensor for sensing the rotor position, and preferably an output signal of the incremental sensor triggers a measurement of the first wind speed and of the second wind speed.

For example, 500 increments can be provided per rotor revolution of 360°. Preferably, an output signal of the incremental sensor triggers the measurement of the first and of the second wind speed. By contrast, at low rotational speeds, a further unit can also trigger the measurement of the first wind speed and of the second wind speed. Said further unit can be, for example, connected to time.

In a further preferred variant embodiment of the method, it is provided that the wind direction is determined at predefined time intervals, for example at a time interval of 1 second, and, for the determination of the wind direction, a prespecified number of measurement values is taken into consideration, wherein the measurement values each represent one of the first wind speeds and one of the second wind speeds.

The prespecified number of first wind speeds and second wind speeds can be, for example, between 30 and 90, in particular between 50 and 70, particularly preferably 60. The time interval can also be less than one second, for example 100 ms.

According to a further aspect, provided is a system for ascertaining a wind direction at a wind power installation having a rotor on which at least one rotor blade is arranged, comprising a wind-sensing unit which is arranged at a measuring point and is configured for measuring first wind speeds in a predefined first measuring direction and second wind speeds in a predefined second measuring direction different from the first measuring direction in each case with a measuring frequency, a controller which is coupled to the wind-sensing unit and is configured to measure first wind speeds and second wind speeds for a measuring period, wherein the measuring period is defined by a rotational distance of the rotor or by a prespecified time, wherein the measuring period is selected in such a manner that the rotor blade or one of the rotor blades passes the measuring point in the measuring period, and to determine a wind direction by vectorial evaluation of the first wind speeds and the second wind speeds.

The system can preferably be combined with all of the particular and preferred refinements described in conjunction with the method. The wind-sensing unit is arranged at the measuring point. The wind-sensing unit can be in the form, for example, of an anemometer, in particular a two-dimensional anemometer, particularly preferably a digital ultrasonic anemometer. The averaging can also take place with the weighting factors already explained previously.

According to a further aspect, provided is a wind power installation which is configured to carry out a method according to one of the variant embodiments described previously, and/or comprising a system according to the previous aspect.

For further advantages, variant embodiments and embodiment details of the further aspects and of the possible developments thereof, reference is also made to the description above of the corresponding features and developments of the method for ascertaining a wind direction at a wind power installation.

BRIEF DESCRIPTION OF THE SEVERAL VIEWS OF THE DRAWINGS

Preferred exemplary embodiments will be explained by way of example with reference to the attached figures, in which.

DETAILED DESCRIPTION

In the figures, identical or substantially functionally identical or functionally similar elements are denoted by the same reference signs.

Figure 1:
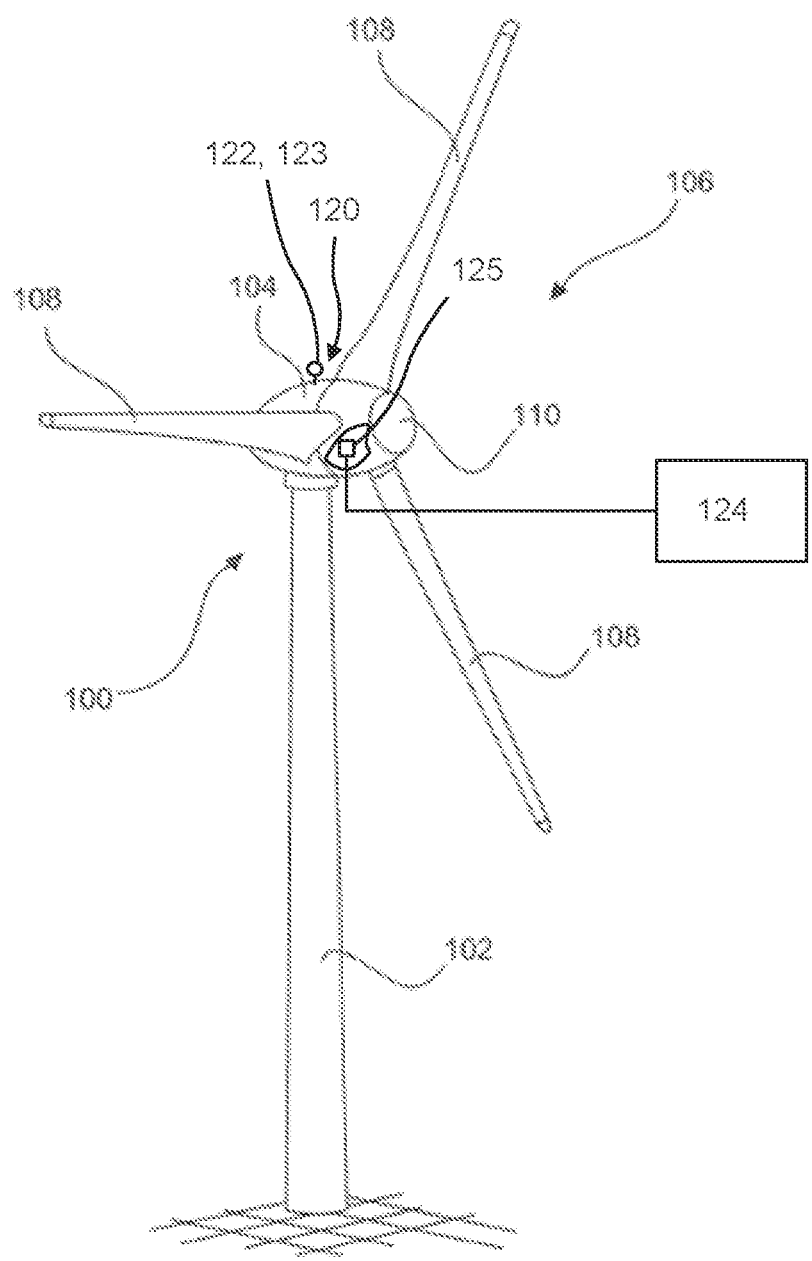
FIG. 1 shows a schematic three-dimensional view of an exemplary embodiment of a wind power installation.

FIG. 1 shows a schematic three-dimensional view of a wind power installation 100. The wind power installation 100 has a tower 102 and a nacelle 104 on the tower 102. An aerodynamic rotor 106 having three rotor blades 108 and a spinner 110 is provided on the nacelle 104. During operation of the wind power installation 100, the aerodynamic rotor 106 is caused to rotate by the wind and thus also rotates an electrodynamic rotor of a generator which is coupled directly or indirectly to the aerodynamic rotor 106. The electric generator is arranged in the nacelle 104 and generates electrical energy.

The wind power installation 100 comprises a system 120 for ascertaining a wind direction. The system 120 comprises a wind-sensing unit 122 which is arranged at a measuring point 123. In one embodiment, the wind-sensing unit 122 comprises one or more wind sensors, such as anemometers. In one embodiment, the wind-sensing unit 122 is a two-dimensional wind senor or anemometer. In another embodiment, the wind-sensing unit 122 comprises two wind sensors, each arranged to measure wind from different directions as each other. In one embodiment, the wind directions are perpendicular from each other. The measuring point 123 or the wind-sensing unit 122 is arranged on the nacelle 104. In particular, the measuring point 123 or the wind-sensing unit 122 is located on an upper portion of the nacelle 104 in the vertical direction. The wind-sensing unit 122 is arranged substantially immovably on the nacelle 104. The wind-sensing unit 122 is configured for measuring first wind speeds in a predefined first measuring direction and second wind speeds in a predefined second measuring direction different from the first measuring direction. The first wind speeds and the second wind speeds are measured with the wind-sensing unit 122 in each case with a measuring frequency.

The system 120 furthermore comprises a controller 124. The controller 124 is configured to attain first wind speeds and second wind speeds for a measuring period, wherein the measuring period is defined by a rotational distance of the rotor 106 or by a prespecified time, wherein the measuring period is selected in such a manner that the rotor blade 108 or one of the rotor blades 108 passes the measuring point 123 in the measuring period; that is, in the present case, one of the rotor blades passes or crosses the 0° position. Furthermore, the controller 124 is configured to determine a wind direction by vectorial evaluation of the first average wind speed and of the second average wind speed.

Furthermore, the wind power installation comprises an incremental sensor 125, which can also be included by the system 120. An output signal of the incremental sensor 125 preferably triggers the ascertaining of the rotational distance and thus the beginning and end of the measuring period. The measurement of the first and of the second wind speed by the wind-sensing unit 122 can take place synchronously with the output signal of the incremental sensor 125 or independently thereof, for example in a buffer store.

Figure 2:
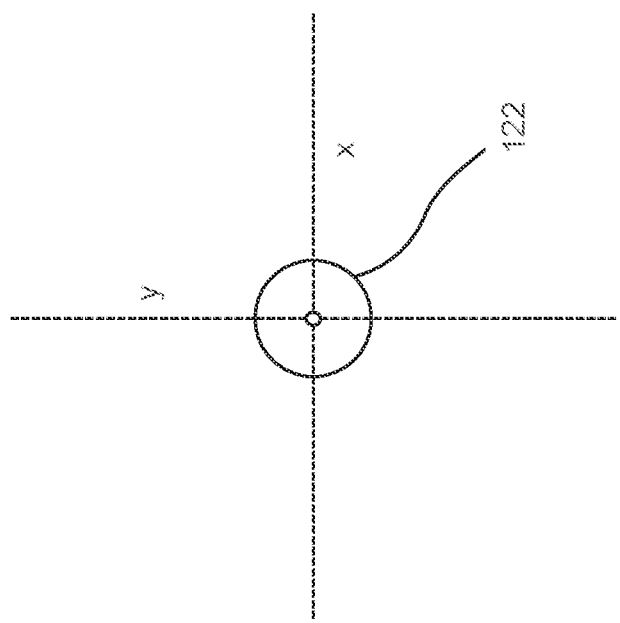
FIG. 2 shows a schematic view of an exemplary embodiment of a wind-sensing unit.

FIG. 2 shows a schematic view of an exemplary embodiment of a wind-sensing unit 122. The wind-sensing unit 122 has a first measuring direction x and a second measuring direction y. The wind-sensing unit 122 measures a wind speed in the first measuring direction x and in the second measuring direction y. The wind-sensing unit 122 is preferably configured in such a manner that it measures substantially no wind speed in a measuring direction that deviates from the first measuring direction x and/or from the second measuring direction y.

Figure 3:
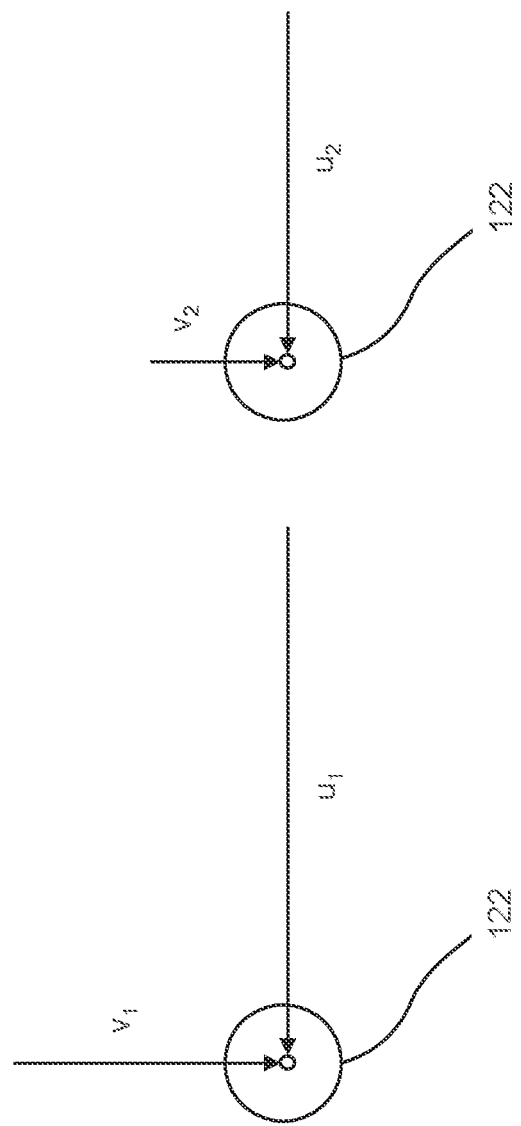
FIG. 3 shows schematic views of the wind-sensing unit shown in FIG. 2 at different wind speeds.

FIG. 3 shows schematic views of the wind-sensing unit 122 shown in FIG. 2 with different wind speeds $u_1$, $u_2$, $v_1$, $v_2$. FIG. 3 in particular shows two different states in which different wind speeds are measured with the wind-sensing unit 122. In the state shown on the left in the image, a first wind speed $u_1$ in a first measuring direction x is shown. Furthermore, it is shown here that a second wind speed $v_1$ is present in a second measuring direction y at the wind-sensing unit 122. On the right in the image, the state is illustrated for a different time with a lower wind speed. It is apparent that the first wind speed $u_2$ in the first measuring direction x and the second wind speed $v_2$ in the second measuring direction y are lower than in the state shown on the left in the image. Should the wind blow precisely from the measuring direction x, the value $u_x$ would assume the wind speed of this wind and the value $v_y$ would be zero.

For ascertaining a first and second average wind speed, which will be explained in more detail below, a plurality of first wind speeds U and second wind speeds V are taken into consideration.

Figure 4:
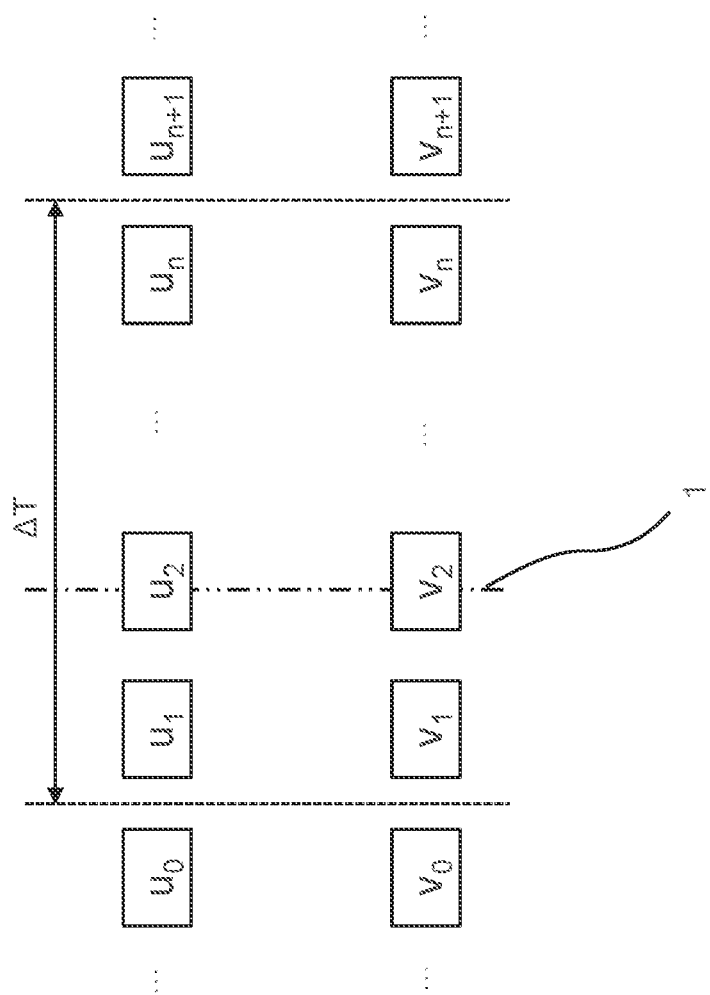
FIG. 4 shows a schematic view of exemplary measurements of first and second wind speeds.

FIG. 4 shows a schematic view of exemplary measurements of first and second wind speeds. This principle for determining the average wind speeds is depicted here in FIG. 4. The wind-sensing unit 122 measures the first wind speeds $u_x$ in the first measuring direction x and the second wind speeds $v_y$ in the second measuring direction y, preferably at continuous intervals.

In order to determine a first average wind speed, a measuring period ΔT is defined. The measurement values $u_1$ to $u_n$ lying in the measuring period ΔT are averaged, for example, for the first wind speed $u_x$ in the first measuring direction x. For this purpose, said measurement values can be for example added up and divided by the number of measurement values being considered in order to obtain an arithmetic mean value. This takes place analogously with the measurement values of the wind speeds $V_1$ to $v_N$ in the second measuring direction y. It is crucial here that a blade passage has taken place at the measuring point 123 in the measuring period ΔT such that the rotor blade 108 or one of the rotor blades 108 passes the measuring point 123 in the measuring period T.

Figure 5:
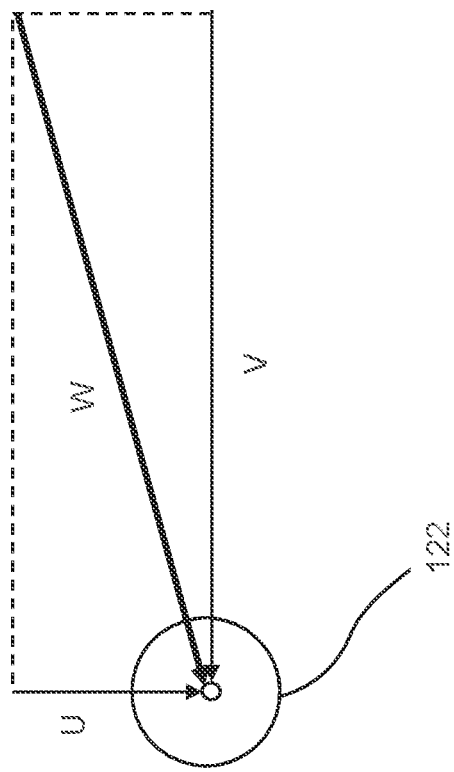
FIG. 5 shows a schematic view of the wind-sensing unit shown in FIG. 2 with a first average wind speed and a second average wind speed and the wind direction resulting therefrom.

FIG. 5 shows a schematic view of the wind-sensing unit 122 shown in FIG. 2 with a first average wind speed U and a second average wind speed V and the wind direction W resulting therefrom. The first average wind speed V can be determined by averaging the first wind speeds $u_x$. Analogously thereto, the second average wind speed U can be determined by averaging the second wind speeds $v_y$. The wind direction W can be determined by the value of the first average wind speed and the value of the second average wind speed and knowledge of the angle between the first measuring direction x and the second measuring direction y.

Figure 6:
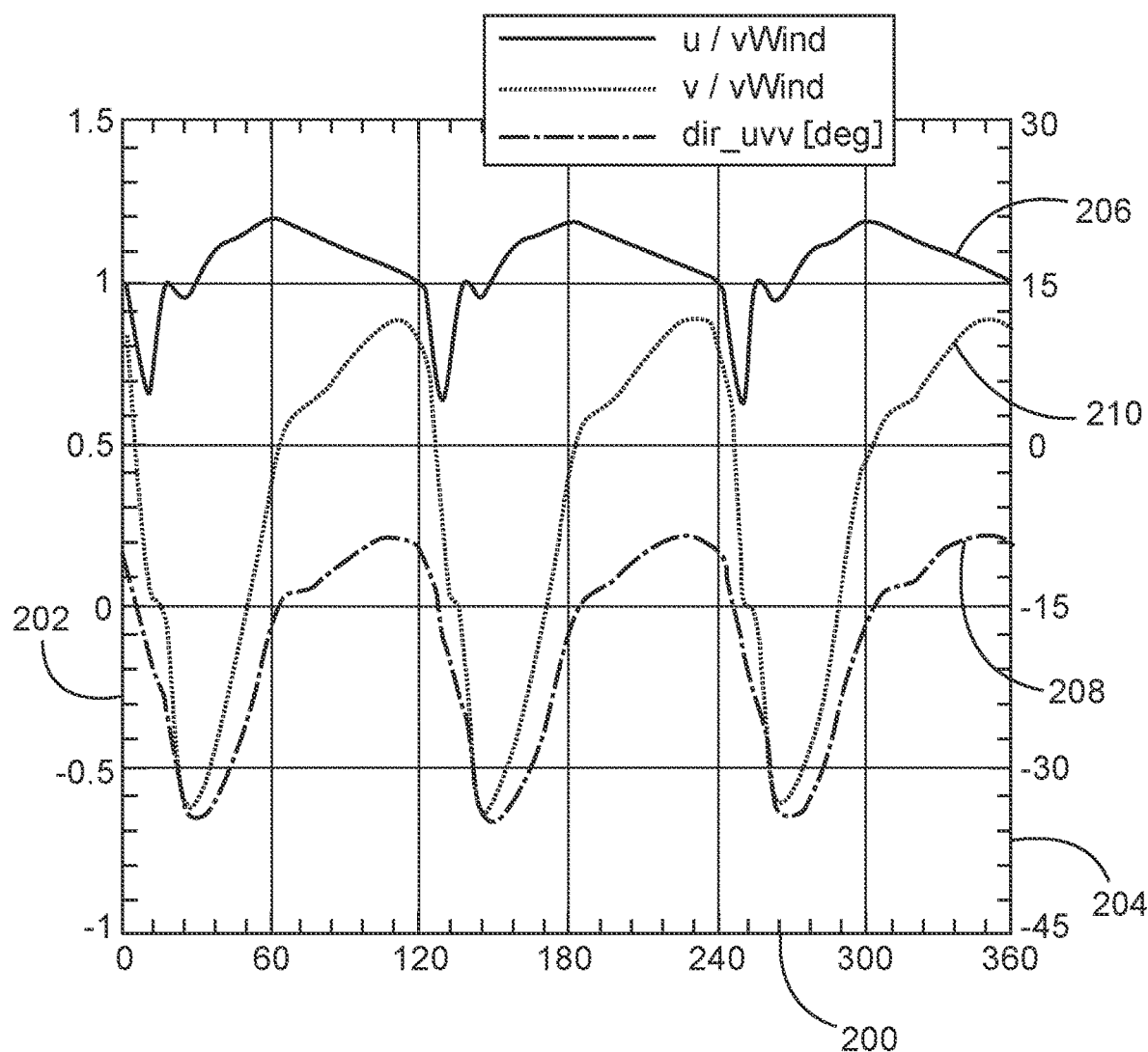
FIG. 6 shows an exemplary diagram of first and second wind speeds and of a wind direction plotted above the rotor angle of rotation.

FIG. 6 shows an exemplary diagram of first and second wind speeds and of a wind direction plotted above the rotor angle of rotation 200. The rotor angle of rotation 200 of the rotor 106 is plotted on the abscissa. From a reference point which is assigned the zero degree position, the rotor 106 rotates from 0 degrees towards 360 degrees. A speed deviation 202 is plotted in percent on the first ordinate, shown on the left, wherein, at a rotor angle of rotation 200 of 0 degrees, a reference point has been placed at 0. A wind direction deviation 204 is illustrated, likewise in percent, on the second ordinate, depicted on the right in the diagram.

The curve 206 represents the wind speed deviation in the first measuring direction x. The curve 208 represents the speed deviation in the second measuring direction. The curve 210 represents the wind direction deviation. The measurement values are related to a measuring point 123, in particular a wind-sensing unit 122. It is apparent that the first and second wind speeds 206, 208 are subject to significant fluctuations along the angle of rotation 200. As a result, the wind direction 210 is also not constant, but rather changes by up to 45° during passage of a rotor blade.

Figure 7:
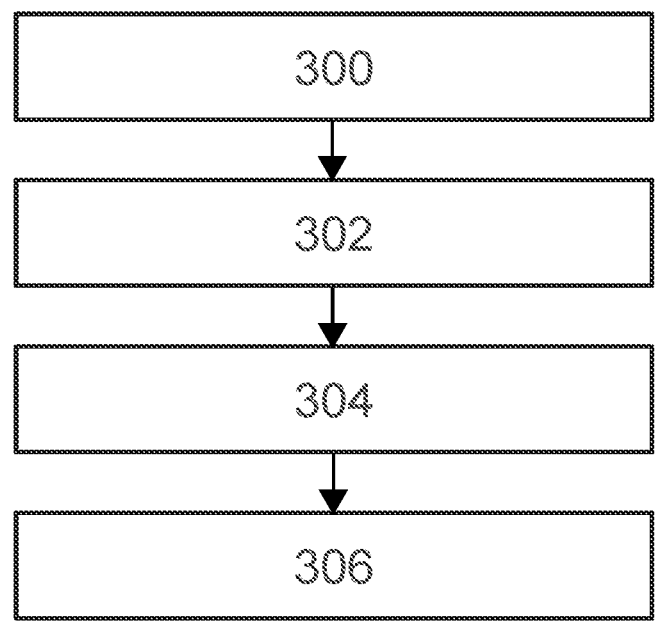
FIG. 7 shows a schematic method.

FIG. 7 shows a schematic method. In the first step 300, first wind speeds $u_x$ in a predefined first measuring direction x and a second wind speed $v_y$ in a predefined second measuring direction y different from the first measuring direction x are measured in each case with a measuring frequency at a measuring point 123. In step 302, a first average wind speed U is determined by averaging the first wind speeds $u_x$.

In step 304, a second average wind speed V is determined by averaging the second wind speeds $v_y$. This takes place for a measuring period. The measuring period ΔT is defined by a rotational distance of the rotor 106 or by a prespecified time. During the measuring period ΔT, the rotor blade 108, or one of the rotor blades 108, passes the measuring point 123. In step 306, a wind direction W is determined by vectorial evaluation of the first average wind speed U and of the second average wind speed V.

REFERENCE SIGNS

1 Blade passage
100 Wind power installation

102 Tower
104 Nacelle
106 Rotor
108 Rotor blades
110 Spinner
120 System for ascertaining a wind direction
122 Wind-sensing unit
123 Measuring point
124 Controller
125 Incremental sensor
200 Angle of rotation
202 Speed deviation in %
204 Wind direction
206 Wind speed in first measuring direction
208 Wind speed in second measuring direction
210 Wind direction
U First average wind speed
$u_x$ First wind speed in first measuring direction x
V Second average wind speed
$v_y$ Second wind speed in second measuring direction y
W Wind direction
x first measuring direction
y second measuring direction
ΔT Measuring period The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for determining a wind direction at a wind power installation having a rotor and at least one rotor blade arranged on the rotor, the method comprising:
measuring first wind speeds in a predefined first measuring direction and second wind speeds in a predefined second measuring direction different from the predefined first measuring direction, wherein the measurements are made, in each case, with a measuring frequency at a measuring point for a measuring period, wherein the measuring period is defined by a rotational distance of the rotor or by a prespecified time at which the at least one rotor blade passes the measuring point in the measuring period; and
determining a wind direction by vectorial evaluation of the first wind speeds and of the second wind speeds, wherein the vectorial evaluation of the first wind speeds and of the second wind speeds comprises determining a first average wind speed by averaging the first wind speeds, and determining a second average wind speed by averaging the second wind speeds, wherein the wind direction is determined by vectorial evaluation of the first average wind speed and of the second average wind speed, or
wherein the vectorial evaluation of the first wind speeds and of the second wind speeds comprises determining wind vectors from the first wind speeds and the second wind speeds for the measuring period, wherein the wind direction is determined by vectorial evaluation of the wind vectors.

2. The method according to claim 1, wherein the measuring point is arranged on a nacelle of the wind power installation, wherein the measuring point is located on an upper portion of the nacelle in a vertical direction, and the measuring point is arranged substantially immovably on the nacelle.

3. The method according to claim 1, wherein the first wind speeds and the second wind speeds are measured with a two-dimensional anemometer.

4. The method according to claim 3, wherein the two-dimensional anemometer is a digital ultrasonic anemometer.

5. The method according to claim 1, wherein the predefined first measuring direction and the predefined second measuring direction are oriented orthogonally with respect to each other.

6. The method according to claim 1, wherein the predefined first measuring direction and the predefined second measuring direction are oriented substantially horizontally.

7. The method according to claim 1, wherein the measuring frequencies for the predefined first measuring direction and for the predefined second measuring direction are substantially identical.

8. The method according to claim 1, wherein:
one of the first wind speeds and one of the second wind speeds are measured substantially isochronously; and/or
there are at most 100 milliseconds between two respective measurements of the first wind speeds and two respective measurements of the second wind speeds; and/or
the prespecified time of the measuring period is less than 10 seconds.

9. The method according claim 1, wherein the rotational distance of the rotor is between 115° and 125°.

10. The method according to claim 1, further comprising:
adjusting the wind direction depending on a set pitch angle or an arising tip speed ratio, or both.

11. The method according to claim 1, further comprising producing a wind direction signal indicative of the wind direction, and weighting the wind direction signal with a weighting factor.

12. The method according to claim 1, further comprising determining an averaged average wind speed by scalar evaluation of the first wind speeds and of the second wind speeds.

13. The method according to claim 1, further comprising using an incremental sensor for sensing the rotor position.

14. The method according to claim 13, wherein an output signal of the incremental sensor triggers a measurement of the first wind speeds and of the second wind speeds.

15. The method according to claim 1, wherein the wind direction is determined at a predefined time interval, and, for the determination of the wind direction, a prespecified number of measurement values is taken into consideration, wherein each of the prespecified number of measurement values represent one of the first wind speeds and one of the second wind speeds.

16. The method according to claim 15, wherein the predefined time interval is 1 second.

17. A system for ascertaining a wind direction at a wind power installation having a rotor and at least one rotor blade arranged on the rotor, the system comprising:
a wind sensor arranged at a measuring point and configured to measure first wind speeds in a predefined first measuring direction and to measure second wind speeds in a predefined second measuring direction different from the predefined first measuring direction for a measuring period, wherein the measuring period is defined by a rotational distance of the rotor or by a prespecified time, wherein the measuring period is selected in such a manner that the at least one rotor blade passes the measuring point in the measuring period; and a controller coupled to the wind sensor and configured to:
receive signals indicative of measurements of the first and second wind speeds; and
determine a wind direction by vectorial evaluation of the first wind speeds and the second wind speeds,
wherein the vectorial evaluation of the first wind speeds and of the second wind speeds comprises determining a first average wind speed by averaging the first wind speeds, and determining a second average wind speed by averaging the second wind speeds, wherein the wind direction is determined by vectorial evaluation of the first average wind speed and of the second average wind speed.

18. A wind power installation comprising:
a nacelle;
a system according to claim 17, wherein the system is arranged on the nacelle; and
wherein the rotor and the at least one rotor blade are arranged on the rotor.

\* \* \* \* \*